United States Patent
Merkel et al.

(10) Patent No.: US 6,308,373 B1
(45) Date of Patent: *Oct. 30, 2001

(54) WIPER BLADE FOR MOTOR VEHICLE WINDSHIELDS

(75) Inventors: Wilfried Merkel, Kappelrodeck; Thomas Kotlarski, Buehlertal, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/011,286
(22) PCT Filed: May 10, 1997
(86) PCT No.: PCT/DE97/00947
 § 371 Date: Feb. 9, 1999
 § 102(e) Date: Feb. 9, 1999
(87) PCT Pub. No.: WO98/01326
 PCT Pub. Date: Jan. 15, 1998

(30) Foreign Application Priority Data

Jul. 5, 1996 (DE) .............................................. 196 278.114

(51) Int. Cl.$^7$ .................................. B60S 1/40; B60S 1/38
(52) U.S. Cl. .................................. 15/250.43; 15/250.451; 15/250.32
(58) Field of Search ..................... 15/250.451, 250.452, 15/250.453, 250.32, 250.43, 250.361

(56) References Cited

U.S. PATENT DOCUMENTS

| | | | | |
|---|---|---|---|---|
| 3,035,298 | * | 5/1962 | Scinta | 15/250.451 |
| 3,192,551 | * | 7/1965 | Appel | 15/250.451 |
| 3,430,285 | * | 3/1969 | Rickett | 15/250.451 |
| 3,626,544 | * | 12/1971 | Lopez et al. | 15/250.361 |
| 3,659,310 | * | 5/1972 | Rosen | 15/250.452 |
| 3,696,497 | * | 10/1972 | Quinlan | 15/250.451 |
| 4,336,625 | * | 6/1982 | Maiocco | 15/250.451 |

FOREIGN PATENT DOCUMENTS

| | | | | |
|---|---|---|---|---|
| 276738 | * | 6/1965 | (AU) | 15/250.452 |
| 1446657 | * | 6/1996 | (FR) | 15/250.451 |
| 862036 | * | 3/1961 | (GB) | 15/250.451 |

* cited by examiner

*Primary Examiner*—Gary K. Graham
(74) *Attorney, Agent, or Firm*—Michael J. Striker

(57) ABSTRACT

A wiper blade is proposed, which is used to clean motor vehicle windows. The wiper blade has an elastic, elongated load bearing element for an elongated wiper strip, made of a flexible material, that can be pressed against the window to be washed, which strip, on its long sides, has longitudinal grooves facing one another, in which spaced-apart longitudinal rails of the load bearing element are located, whose middle portion has a connection device for a driven wiper arm, and the cross section of the two longitudinal rails decreases from its middle region out toward the ends of the rails. A wiper blade that is especially easy to mount is obtained if the load bearing element takes the form of a hairpin, the two legs of which form the longitudinal rails, and the free ends of the two longitudinal rails are held together, in particular being joined together, by stabilizing means embodied as a separate component.

8 Claims, 2 Drawing Sheets

WIPER BLADE FOR MOTOR VEHICLE WINDSHIELDS

BACKGROUND OF THE INVENTION

The invention is based on a wiper blade. In a known wiper blade of this type (German Patent Application DE 26 14 457 A1), the load bearing element that distributes the contact pressure of the wiper blade on the window over the entire length of the wiper strip is provided with a slitlike longitudinal opening, through which a longitudinal rib of the wiper strip body extends outward from one side of the load bearing element, and its free end is thickened in such a way that on the other side it forms a retaining or securing means to prevent unintended loosening of the wiper strip from the load bearing element. The longitudinal rails of the load bearing element come to rest in longitudinal grooves of the wiper strip, which grooves are defined on their long sides on the one hand by the body of the wiper strip and on the other by the thickening of the longitudinal rib. For mounting the wiper strip to the load bearing element, the wiper strip must be threaded by hand into its longitudinal slit through a partial widening thereof, but this is very complicated and tedious and thus expensive.

SUMMARY OF THE INVENTION

In keeping with these objects, the wiper blade in accordance with the present invention has a load bearing element formed as a hairpin with two legs forming longitudinal rails, the free ends of the longitudinal rails are held together by stabilizing means formed as a separate component, and the separate component is a clamp which is compressable so as to form a wiper blade body and thereby to secure the clamp on the wiper strip.

Because of the embodiment of the load bearing element in the shape of a hairpin, there is an open mouth of the longitudinal slit on one end of the load bearing element, which enables simple and possibly even automatic mounting of the wiper strip on the load bearing element. The disposition and securing of the clamps, made as mass-produced parts, to the free ends of the longitudinal rails can also be done by means of an automatic assembler.

A cross-sectional reduction in the load bearing element can be attained especially simply and hence economically if it is realized by reducing the width or of the load bearing element, with the greatest width located in the middle portion of the load bearing element.

However, such a cross-sectional reduction of the load bearing element can also be attained, however, by reducing the thickness of the load bearing element, with the greatest thickness located in the middle portion of the load bearing element.

Depending on the selection of materials for the clamp of the embodied stabilizing means, it can be expedient if this means is joined to the longitudinal rails nonpositively or positively. Naturally, a connection that is both nonpositive and positive is also possible.

If the longitudinal length of the load bearing element exceeds a certain amount, causing a certain instability of the longitudinal rails, the requisite stability of the load bearing element can be assured by providing that at least one further intermediate clamp is disposed between the clamp that is disposed on the free ends of the longitudinal rails and a strut that forms the base of the hairpin shape; this intermediate clamp, with claw attachments, fits around the long edges, remote from one another, of the longitudinal rails.

A further simplification of the wiper blade is obtained if in a feature of the invention the further clamp is equipped with a connection device for the driven wiper arm.

If at least the longitudinal rails of the load bearing element are made from spring band steel, then a wiper blade with an especially low structure can be attained, which has good properties in terms of the flow conditions of the oncoming air that exist ahead of the windshield.

Further advantages of and improvements to the wiper blade can be learned from the ensuing description of an exemplary embodiment, which will be described in conjunction with the drawing.

BRIEF DESCRIPTION OF THE DRAWINGS

FIG. 5 is a perspective view, not to scale, of a load bearing element belonging to the wiper blade and of a clamp belonging to the load bearing element.

DESCRIPTION OF THE PREFERRED EMBODIMENTS

Figure 1:
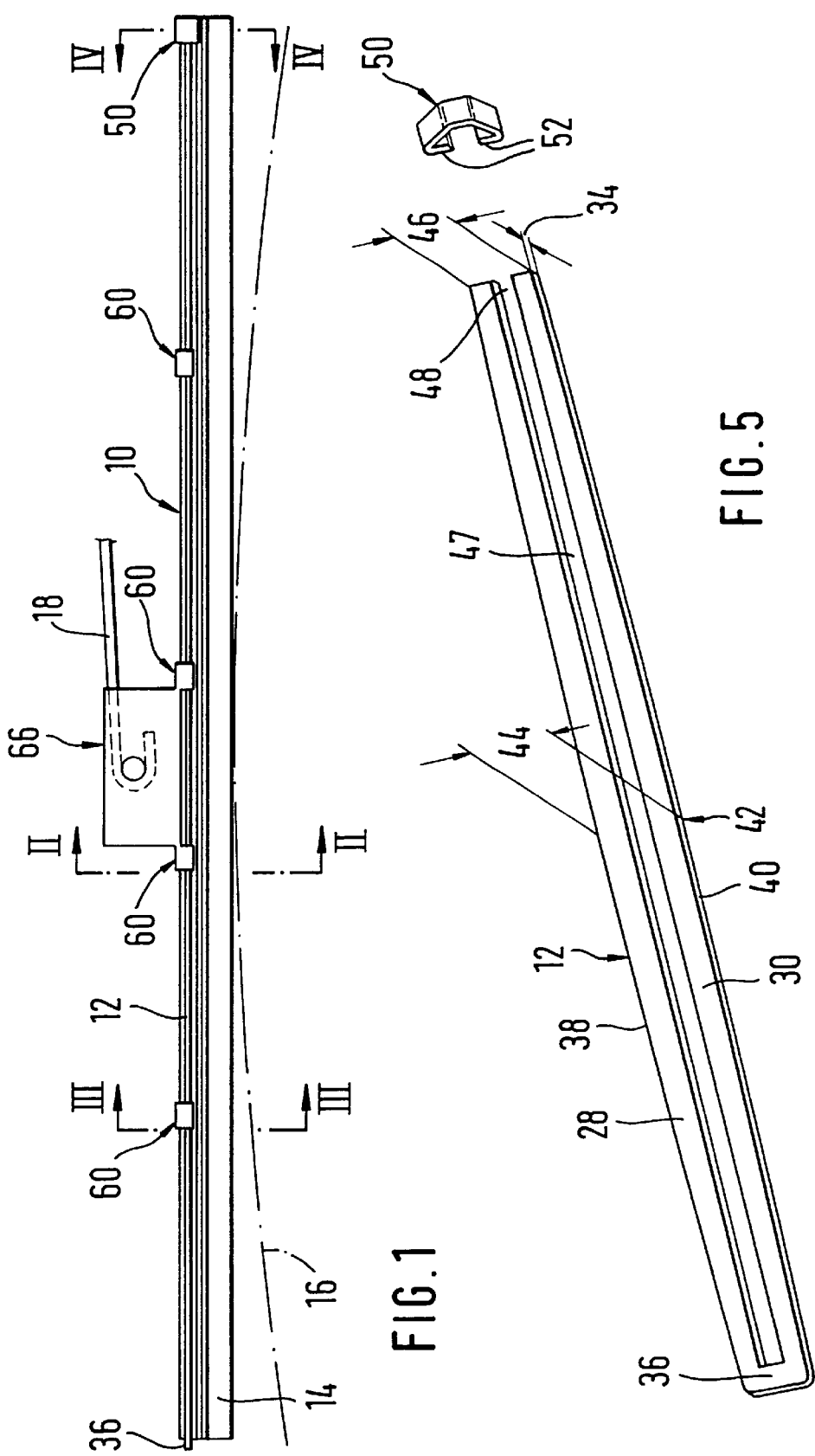
FIG. 1 shows a side view of a wiper blade according to the invention.

A wiper blade 10 shown in FIG. 1 has an elastic load bearing element 12, in the exemplary embodiment made from spring band steel, for a wiper strip 14 made from a rubberlike material. In FIG. 1, the elongated wiper blade 10, for the same of simplicity, is shown in a position in which it cannot actually be located in practice, because the elastic load bearing element is prestressed in such a way that the wiper strip 14 is curved, as is suggested by a dot-dashed line 16 in FIG. 1. This curvature is greater than the maximum curvature of the generally spherically curved motor vehicle window to be wiped. In other words, when the wiper blade 10 is applied to the window to be wiped, it first contacts the window with its two end regions, and finally the middle region of the wiper blade is also pressed against the window. This curvature, just now described, of the load bearing element 12 and thus of the wiper blade 10 is intended, given careful adaptation, to produce the most uniform possible distribution of the contact pressure, exerted by the driven wiper arm 18, against the window.

The general design of the wiper blade 10 will now be explained below in conjunction with FIGS. 1–3. The wiper strip 14 has a wiper lip 17, which can be applied against the window and is joined to the body 22 of the wiper strip 14 via a so-called tilting strut 20. In the two long sides, facing one another, of the wiper strip body 22, there are longitudinal grooves 24 and 26 facing one another, which extend over the entire length of the elongated wiper strip 14. Longitudinal rails 28 and 30 of the load bearing element 12 are accommodated in the longitudinal grooves 24 and 26; the design of this load bearing element can be seen from FIG. 5. In the exemplary embodiment, the load bearing element is made from a spring band steel. It has a uniform thickness 34 over its entire length. The load bearing element 12 takes the shape of a hairpin. The two longitudinal rails 28 and 30 then form the legs of the hairpin, which on one end are integrally joined by a strut 36 that joins the two longitudinal rails. The result is accordingly a one-piece component whose width is defined by the long edges 38 and 40, facing away from one another, of the longitudinal rails 28 and 30. The embodiment of the load bearing element 12 is selected such that in its middle portion 42, it has a greater width 44 than the width 46 in the region of the free ends of the longitudinal rails 28, 30 or of the strut 36. The result is accordingly a reduction in the cross section of the two longitudinal rails from the middle portion 42 toward the ends of the rails. However, this cross-sectional reduction can also be attained by reducing the thickness of the longitudinal rails—while the width of the longitudinal rails remains constant or is decreased.

The described hairpin shape of the load bearing element 12 accordingly provides that the two longitudinal rails 28 and 30 are disposed parallel to and spaced apart from one another. In the load bearing element 12, the result is a longitudinal slit 47, whose mouth is in the region of the free ends of the longitudinal rails 28 and 30. This mouth 48 enables mounting of the wiper strip 14 and load bearing element 12 without problems. All that need be done to achieve this is that the wiper strip 14 be slipped, from the direction of the mouth 48, onto the load bearing element 12 in such a way that the two longitudinal rails 28 and 30 come to rest in the longitudinal grooves 24 and 26 of the wiper strip body 22 (FIGS. 2 and 3). In this process, the wiper strip 14 is inserted into the load bearing element as far as the strut 36. To secure the wiper strip 14 on the load bearing element 12, a clamp 50 acting as a stabilizing means is attached to the free ends of the longitudinal strips 28 and 30. This clamp 50, embodied as a separate component, fits around part of the wiper strip body 22 and, with claw attachments 52, engages the longitudinal rails 28, 30 of the load bearing element 12, which are located in the longitudinal grooves 24 and 26, from beneath. Since as a result of the reduction in the width 44, 46 of the load bearing element these longitudinal rails in the region of their free ends no longer protrude out of the longitudinal grooves 24, 26, the claw attachments 52 do not engage directly beneath the longitudinal rails but instead engage the lower walls 54 and 56 of the longitudinal grooves 24 and 26 from beneath, these grooves being formed by a groovelike longitudinal constriction 58 of the wiper strip body 22. By purposeful compression of the clamp 50, a certain deformation of the wiper strip body 22 is attained, and as a result securing of the load bearing element 12 to the wall and securing of the clamp 50 that belongs to the load bearing element 12 to the wiper strip 14 is also attained. However, a positive securing of the clamp 50 to the longitudinal rails 28, 30 and/or to the wiper strip 14 is also conceivable.

Figure 2:
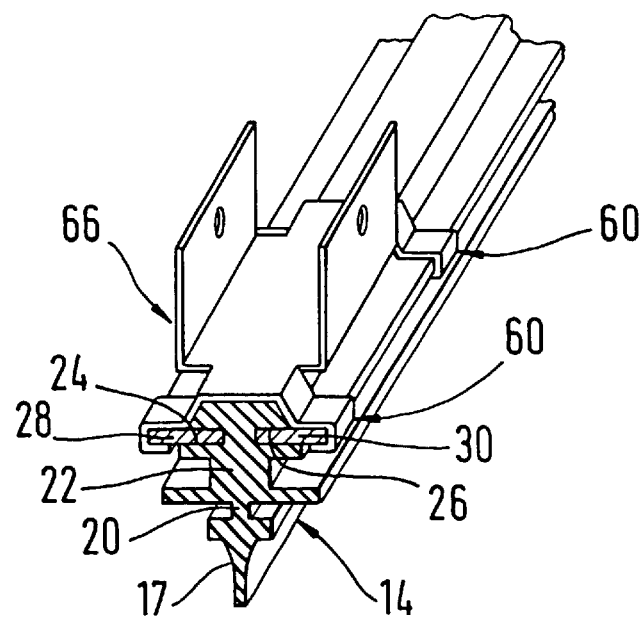
FIG. 2 is a section through the wiper blade taken along the line II—II of FIG. 1, with a middle portion of the wiper blade shown enlarged and in perspective.
Figure 3:
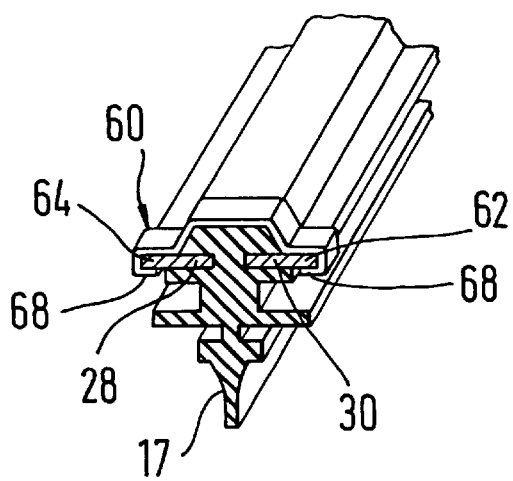
FIG. 3 is a section through the wiper blade taken along the line III—III of FIG. 1, with an intermediate portion of the wiper blade shown enlarged and in perspective.
Figure 4:
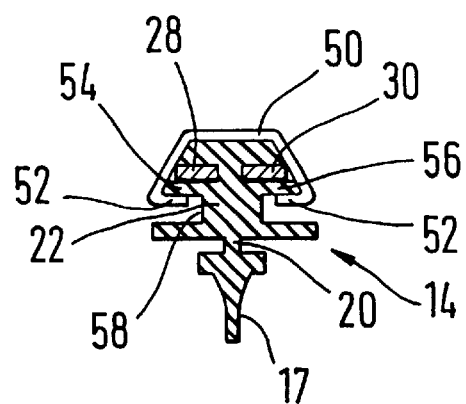
FIG. 4 shows an enlarged sectional surface of a section through the wiper blade taken along the line IV—IV of FIG. 1.

If the length of the wiper blade 10 and thus the length of the hairpin-shaped load bearing element 12 exceeds a certain amount, then it may be expedient, to dispose intermediate clamps 60, which are identified by reference numeral 60 in FIGS. 1–3, between the free ends of the longitudinal rails 28, 30 and the strut 36 forming the base of the hairpin shape. The embodiment of these so-called intermediate clamps 60 is substantially equivalent to the embodiment described for the terminal clamp 50. However, because these intermediate clamps are disposed in the middle region of the load bearing element (FIG. 1), in which the long edges 38, 40, facing away from one another, of the longitudinal rails protrude out of the longitudinal grooves 24, 26, claw attachments 68 of these intermediate clamps 60 can fit directly around the longitudinal strips 62, 64, protruding out of the longitudinal grooves, of the longitudinal rails 28, 30.

Another advantageous feature of the intermediate claws 60 can be seen from FIGS. 1 and 2. There, two adjacent intermediate claws 60 are combined into a single component, since they are joined together by a connection device 66, with the aid of which the wiper blade 10 can be releasably secured to the driven wiper arm 18 in a manner known per se.

It will be immediately understood that the aforementioned change in the cross section of the two longitudinal rails 28, 30 or of the load bearing element 12 from its middle portion 42 outward must be adapted to existing conditions, so that a proper distribution of the contact pressure over the entire length of the wiper blade is attained.

What is claimed is:

1. A wiper blade for motor vehicle windows, comprising an elongated wiper strip adapted to be pressed against a window to be washed, said wiper strip having a wiper strip body and being composed of a fexible material, said wiper strip on its long sides being provided with longitudinal grooves facing one another; an elastic, elongated load bearing element having space-apart longitudinal rails located in said longitudinal grooves of said wiper strip; a one piece connection device provided only in a middle portion of said load bearing element for a driven wiper arm and mounted directly to said load bearing element, said connection device having an elongate planar bottom wall defining an upper and lower surface with walls extending upwardly from said upper surface, said lower surface engaging said wiper strip body, each end of said bottom wall having an intermediate clamp thereon extending downwardly which engages said spaced rails, said load bearing element being formed as a hair pin with two legs which form said longitudinal rails having free ends; stabilizing means holding at least said free ends of said longitudinal rails together and formed as a separate component, said separate component being formed as a first clamp located at said free ends.

2. A wiper blade as defined in claim 1, wherein said longitudinal rails have a transverse cross-section decreasing from a middle region toward ends of said rails.

3. A wiper blade as defined in claim 1, wherein said load bearing element has a reducing transverse cross-section such that a width of said load bearing element reduces with a greater width located in a middle portion of said load bearing element.

4. A wiper blade as defined in claim 1, wherein said load bearing element has a reducing transverse cross-section so that a thickness of said load bearing element reduces with a greater thickness located in a middle portion of said load bearing element.

5. A wiper blade as defined in claim 1, wherein said first clamp is joined to said longitudinal rails of said load bearing elements.

6. A wiper blade as defined in claim 1, and further comprising a strut which forms a base of said hair pin.

7. A wiper blade as defined in claim 1, wherein at least one of said clamps has claw attachments formed so that said at least one clamp together with said claw attachments fits around long edges of said longitudinal rails.

8. A wiper blade as defined in claim 1, wherein said load bearing element is composed of spring band steel.

* * * * *